United States Patent
Geer et al.

(10) Patent No.: US 6,627,117 B2
(45) Date of Patent: Sep. 30, 2003

(54) METHOD FOR APPLYING A COATING THAT ACTS AS AN ELECTROLYTIC BARRIER AND A CATHODIC CORROSION PREVENTION SYSTEM

(75) Inventors: Steven K. Geer, Tallmadge, OH (US); Todd R. Hawkins, Massillon, OH (US)

(73) Assignee: GeoTech Chemical Company, LLC, Tallmadge, OH (US)

( * ) Notice: Subject to any disclaimer, the term of this patent is extended or adjusted under 35 U.S.C. 154(b) by 0 days.

(21) Appl. No.: 10/205,048

(22) Filed: Jul. 24, 2002

(65) Prior Publication Data

US 2002/0195592 A1 Dec. 26, 2002

Related U.S. Application Data

(63) Continuation-in-part of application No. 09/695,262, filed on Oct. 24, 2000, now Pat. No. 6,440,332, which is a continuation of application No. 09/361,505, filed on Jul. 23, 1999, now Pat. No. 6,231,789, which is a continuation of application No. 09/094,092, filed on Jun. 9, 1998, now Pat. No. 5,976,419.

(51) Int. Cl.[7] ............................. H01B 1/00; H01B 1/02; B05D 3/00; C09D 5/10

(52) U.S. Cl. ....................... 252/512; 252/500; 252/513; 427/180; 427/327; 427/384

(58) Field of Search ................. 252/512, 500, 252/513; 427/180, 327, 384

(56) References Cited

U.S. PATENT DOCUMENTS

| | | | |
|---|---|---|---|
| 3,546,155 A | 12/1970 | Chandler | |
| 3,748,172 A | 7/1973 | Speirs et al. | |
| 3,862,851 A | 1/1975 | Speirs et al. | |
| 4,009,131 A | 2/1977 | Farone | |
| 4,048,136 A | 9/1977 | Kobayashi et al. | |
| 4,086,153 A | 4/1978 | Ariga et al. | |
| 4,130,469 A | 12/1978 | McGinniss | |
| 4,140,816 A | 2/1979 | McGinniss | |
| 4,163,810 A | 8/1979 | McGinniss | |
| 4,518,726 A | 5/1985 | Kato et al. | |
| 5,069,820 A | 12/1991 | Jen et al. | |
| 5,160,457 A | 11/1992 | Eisenbaumer | |
| 5,217,649 A | 6/1993 | Kulkarni et al. | |
| 5,281,363 A | 1/1994 | Shacklette et al. | |
| 5,290,483 A | 3/1994 | Kulkarni et al. | |
| 5,456,862 A | 10/1995 | Kwan-Yue et al. | |
| 5,532,025 A | 7/1996 | Kinlen et al. | |
| 5,567,355 A | 10/1996 | Wessling et al. | |
| 5,645,890 A | 7/1997 | MacDiarmid et al. | |
| 5,648,416 A | 7/1997 | Miller et al. | |
| 5,658,649 A | 8/1997 | Wrobleski et al. | |
| 5,853,621 A | 12/1998 | Miller et al. | |
| 5,871,671 A | 2/1999 | Kinlen et al. | |
| 5,976,419 A | * 11/1999 | Hawkins et al. | ............. 252/512 |
| 6,231,789 B1 | * 5/2001 | Hawkins et al. | ............. 252/512 |
| 6,440,332 B1 | * 8/2002 | Geer et al. | ................. 252/512 |
| 2002/0195592 A1 | * 12/2002 | Geer et al. | ................. 252/500 |

FOREIGN PATENT DOCUMENTS

| | | | | |
|---|---|---|---|---|
| JP | 7-103185 | 10/1996 | | |
| JP | 08277370 | * 10/1996 | ............ | C09D/5/00 |
| WO | WO 99/64524 | * 12/1999 | ............ | C09D/5/10 |

OTHER PUBLICATIONS

International Search Report—3 pages for PCT/US99/10991, Aug. 5, 1999.

* cited by examiner

*Primary Examiner*—Mark Kopec
*Assistant Examiner*—Brian P. Mruk
(74) *Attorney, Agent, or Firm*—Brouse McDowell; John M. Skeriotis; Daniel A. Thomson

(57) ABSTRACT

A coating system for ferrous and nonferrous metal substrates that provides cathodic protection from corrosion by coating with inherently conductive polymers and sacrificial anodic metal particles. The coating system is formed by a process that includes premixing of the inherently conductive polymer with the anodic metal particles to form a inherently conductive polymer/metal particle complex.

18 Claims, 2 Drawing Sheets

METHOD FOR APPLYING A COATING THAT ACTS AS AN ELECTROLYTIC BARRIER AND A CATHODIC CORROSION PREVENTION SYSTEM

This Application is a Continuation-In-Part application of application Ser. No. 09/695,262, filed Oct. 24, 2000, currently U.S. Pat. No. 6,440,332, which is a Continuation of application Ser. No. 09/361,505 filed Jul. 23, 1999, currently U.S. Pat. No. 6,231,789, which is a Continuation of application Ser. No. 09/094,092 filed Jun. 9, 1998, now U.S. Pat. No. 5,976,419.

I. BACKGROUND OF THE INVENTION

A. Field of Invention

This invention pertains to a corrosion prevention system and method of producing the same, and more specifically to a system for protecting a metal substrate from corrosion utilizing a cathodic coating comprising at least one inherently conductive polymer and sacrificial metal particles.

B. Description of the Related Art

One type of coating used to protect metals from corrosion is called a barrier coating. Barrier coatings function to separate the metal from the surrounding environment. Some examples of barrier coatings include paints and nickel and chrome plating. However, as with all barrier coatings, holidays in the barrier coatings leave the metal substrate susceptible to corrosion. Electrochemically active barrier coatings, such as nickel, chrome, and conductive polymer layers, can actually accelerate corrosion of underlying metals at holidays in the coating.

Another type of coating used to protect metal substrates is called sacrificial coatings. The metal substrate is coated with a material that reacts with the environment and is consumed in preference to the substrate it protects. These coatings may be further subdivided into chemically reactive, e.g., chromate coatings, and electrochemically active, or galvanically active, e.g., aluminum, cadmium, magnesium, and zinc. The galvanically active coatings must be conductive and are commonly called cathodic protection.

In the art, a major difficulty has been the creation of a coating that protects like a cathodic system but is applied with the ease of a typical barrier coating system. Furthermore, there are many environmental drawbacks with both traditional barrier and sacrificial methods, from use of high levels of volatile organic compounds to expensive treatment of waste waters produced by plating and subsequent surface preparation for top-coating processes.

The present invention contemplates a new and improved coating system and method of producing the same which overcomes the foregoing difficulties and others while providing better and more advantageous overall results.

II. SUMMARY OF THE INVENTION

In accordance with the present invention, a new and improved cathodic corrosion resistant coating system is provided which may be easily applied in an environmentally friendly, efficient, safe and cost effective way to a metal substrate.

More particularly, the coating system utilizes at least one inherently conductive polymer in combination with galvanically anodic metals dispersed in a resin matrix and applied to a metal substrate to create a cathodic coating which is corrosion resistant.

According to one aspect of the invention, there is provided a method of preparing a coating system adapted for use on an associated metallic substrate, the coating system including a resin binder, an inherently conductive polymer, metallic particles which are anodic to the metallic substrate, and a curing agent. The method includes the steps of mixing the inherently conductive polymer with the metallic particles to form a blend including an inherently conductive polymer/metal particle complex; providing a resin binder selected from the group consisting of water-borne resin systems and solvent-borne resin systems, providing a curing agent; and, mixing the blend, the resin binder, and the curing agent prior to application to the associated metallic substrate.

According to another aspect of the invention, the step of mixing the inherently conductive polymer with the metallic particles includes the steps of mixing the inherently conductive polymer with metallic particles at a process temperature of between 100° F. to 220° F., inclusive.

According to another aspect of the invention the process temperature is maintained for a sufficient period of time, in order to drive off a predetermined amount of $H_2$-According to another aspect of the invention the step of mixing the blend, the resin binder and the curing agent includes the steps of preparing a Part A resin component by combining the blend with the resin binder; preparing a Part B cure component including the curing agent; and, combining a predetermined amount of the Part A resin component with a predetermined amount of the Part B cure component immediately prior to application to the associated metallic substrate.

According to another aspect of the invention, the step of mixing the blend, the resin binder and the curing agent includes the steps of preparing a Part A resin component including the resin binder; preparing a Part B cure component by combining the blend with the curing agent; and, combining a predetermined amount of the Part A resin component with a predetermined amount of the Part B cure component immediately prior to application to the associated metallic substrate.

According to another aspect of the invention, the method further includes the step of combining a predetermined amount of nano-scale polymerized clay materials with the blend prior to the step of mixing the blend, the resin binder, and the curing agent.

According to another aspect of the invention, the method further includes the step of combining a predetermined amount of nano-scale polymerized clay material into the resin binder prior to the step of mixing the blend, the resin binder, and the curing agent.

According to another aspect of the invention, the step of mixing the inherently conductive polymer with the metallic particles further includes the steps of providing the inherently conductive polymer in an amount from approximately 1% to 35% by volume of the coating system; and, providing the metallic particles in an amount from approximately 5% to 20% by volume of the coating system.

According to another aspect of the invention, there is provided a coating system formed by the method provided above wherein the inherently conductive polymer is at least one member of the group consisting of polyaniline, ligno-sulfonic acid-doped polyaniline, polypyrrole, polythiopene, polyacetylene, poly (p-phenylene), poly (p-phenylene vinylene), poly (p-phenylene sulfide) and polyaniline substituted with alkyl, aryl, hydroxy, alkoxy, chloro, bromo, or nitro groups; the metal is at least one member of the group consisting of aluminum, cadmium, magnesium, zinc, aluminum alloys, cadmium alloys, magnesium alloys and zinc alloys; the resin binder is at least one member of the group consisting of polyurethanes, epoxies, neutral resins, acidic resins, acrylates, polyesters, and glycidyl acrylates; and, the curing agent is at least one member of the group consisting of sulfonamide, anhydride types, free radical photoinitiators, cationic photoinitiators, and amine types.

According to another aspect of the invention, the at least one inherently conductive polymer comprises between 1% and 35% by volume of the coating system.

According to another aspect of the invention, the metal comprises between 5% and 20% by volume of said coating composition.

According to another aspect of the invention, there is provided a method of protecting a metallic substrate from corrosion including the steps of preparing a coating system comprising a resin binder, an inherently conductive polymer, metallic particles which are anodic to the metallic substrate, and a curing agent wherein the inherently conductive polymer is premixed with the metallic particles at a predetermined process temperature for a predetermined period of time to form a inherently conductive polymer/metal particle complex; preparing a surface of the metallic substrate for adhesion to the coating system; coating the prepared surface with the coating system; and, curing the coating composition to form a corrosion resistant coating on the prepared surface.

According to another aspect of the invention, the coating system is a powder coating system and the step of coating the prepared surface with the coating system includes the step of electrostatically applying the coating system to the associated substrate.

According to another aspect of the invention, there is a coating system formed by the method provided above wherein the inherently conductive polymer is substituted with an electroactive material and may be a member of the group consisting of tannins, o-catechol, p-catechol, 1,4-phenylenediamine, 1,2-phenylenediamine, trimer of aniline (i.e. oxidative polymerization product of 1 mole of 1,4-phenylenediamine and 2 moles of aniline) and several organic dyes.

According to another aspect of the invention, at least one electroactive material comprises between 1% and 35% by volume of the coating system.

One advantage of the present invention is that the claimed process can provide water-borne or solvent-borne coating systems.

Another advantage of the present invention is that the claimed process produces coating systems having improved performance in the areas of corrosion protection, adhesion, hardness, stability, etc. over similar formulations, having the same ratios of the components made in a conventional manner.

Another advantage of the present invention is that a powder coating system utilizing the claimed process may be electrostatically applied.

Another advantage of the present invention is the cost effectiveness of the process. The coating may be produced at a reasonable cost and applied with existing application systems. Use of the inventive coating system will extend service life and reduce the costs associated with corrosion maintenance.

Another advantage of the present invention is that the methods disclosed herein may be used in formulations over a wider pH range than conventional coating systems.

Another advantage of the present invention is the provision of coating compositions utilizing the amine family of hardeners in conjunction with the inherently conductive polymer without de-doping effects.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
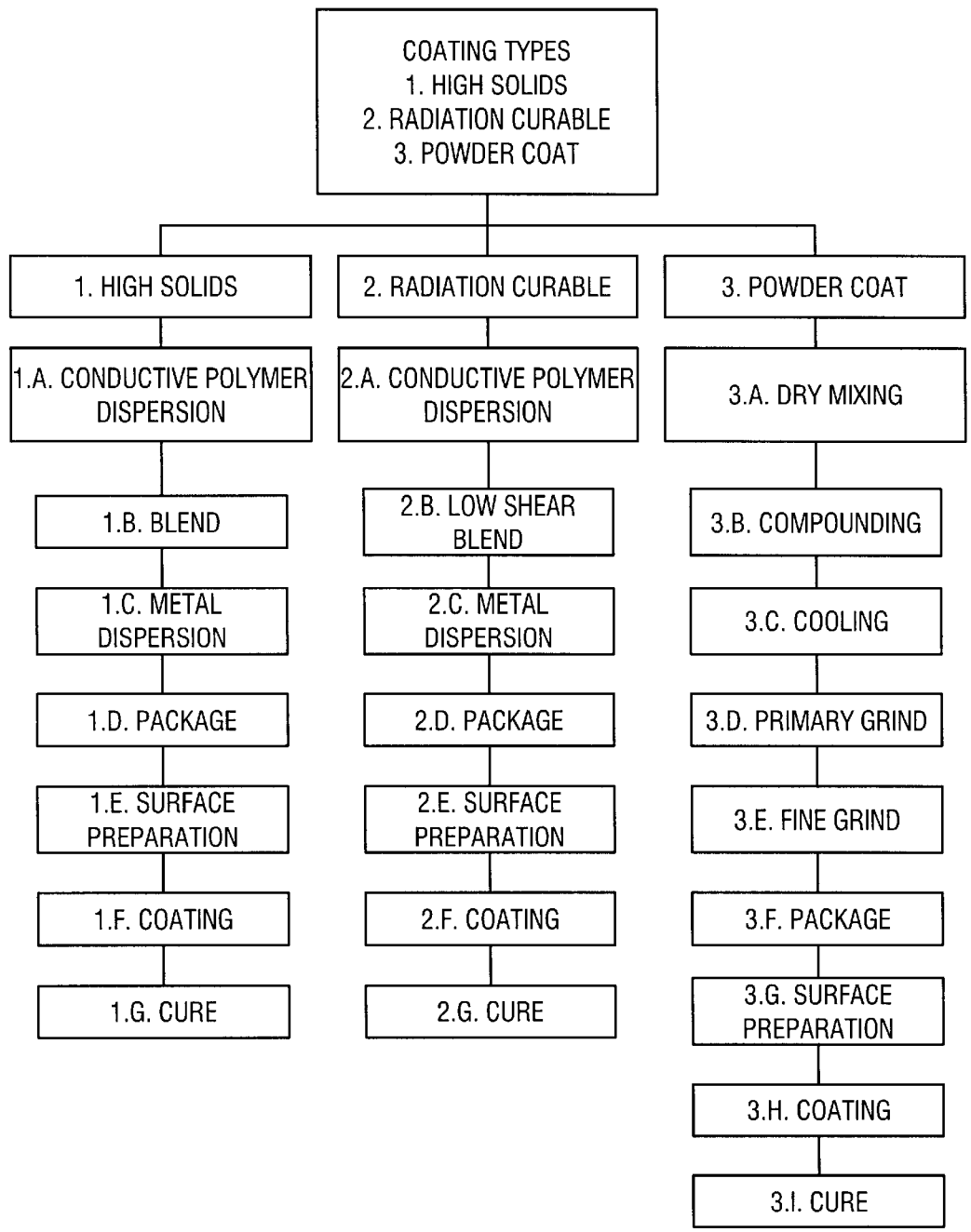
FIG. 1 shows a process flow chart for producing three types of cathodic coatings according to the invention.

The present invention concerns a cathodic coating for ferrous or non-ferrous metal substrates. Generally, the coating system utilizes inherently conductive polymers and metal particles anodic to the metallic substrate dispersed in a coating matrix. It has been found that the coating system disclosed herein provides unexpected and significantly improved corrosion protection by forming an adherent, electrochemically active, and truly cathodic protective coating.

The inventive coating system effectively creates an electron path by the thorough dispersion of one or more conductive polymers and metal particles which eliminates dielectric barriers associated with other organic systems, thus creating a protective galvanic corrosion cell.

The present invention is directed to coating systems utilizing at least one inherently conductive polymer and metal particles anodic to the substrate which are pre-blended in predetermined proportions before dispersion in either the resin base, or the curing component. The coating systems of the present invention may be formulated as high solids systems, radiation curable systems, and powder coat systems and may be water borne or solvent borne.

For the purposes of the present invention, "High Solids" means an ambient temperature curable coating that complies with the Los Angeles County Rule 66 definition, i.e. 80% non-volatiles by volume or greater. "Radiation Curable" involves the polymerization and cross-linking of functional monomers and oligomers (usually liquid, can be a powder) into a cross-linked polymer network (usually a solid film) induced by photons (UV curing) or electrons (EB curing). The curing can occur by either free radical or cationic polymerization. Infrared and beta radiation can also be utilized as energy sources for some radiation cure processes. "Powder Coating" involves coating objects with electrostatically sprayed, thermally sprayed, or fluidized polymer powder under influence of thermal energy causing the fine powder to melt or cross link around the object and upon cooling to produce a compact polymeric layer. The process steps and equipment to produce the coatings of the present invention are described below.

In general, the preferred conductive polymer for use in each of the systems is polyaniline. Aluminum is the preferred anodic metal particulate, however, any anodic metal that creates sufficient potential difference from the metal substrate may be used according to the invention. Preferably, at least a 0.02 volt potential difference is established. In the preferred embodiment, the coating should produce a polarize cathode surface of −0.85 volts or more electronegative potential when measured using a copper—copper sulfate electrode place close to the electrolyte/structure interface. This measurement is actually a measurement of voltage drop at the interface of the metallic substrate surface and the electrolyte with the reference cell being one contact terminal and the metal surface being the other terminal.

General formulations for the coating systems according the invention are set forth as follows:

A. Resin Base:
 1. High Solid Coatings
  a. Polyurethane
  b. Epoxy
  c. Neutral or acidic pH resins
 2. UV Radiation Curable
  a. Acrylates
  b. Polyurethane
  c. Epoxy
  d. Polyester
 3. Powder Coat
  a. Epoxy
  b. Polyurethane
  c. Polyester
  d. Glycidyl acrylate
  f. Hybrids or resin blends, i.e. polyester and epoxy B. Inherently Conductive Polymers
 1. Polyaniline
 2. Polypyrrole
 3. Polythiopene
 4. Polyacetylene
 5. Poly (p-phenylene)
 6. Poly (p-phenylene vinylene)
 7. Poly (p-phenylene sulfide)
 8. Polyaniline substituted with alkyl, aryl, hydroxy, alkoxy, chloro, bromo, or nitro groups C. Anodic Metal Particles
 1. Aluminum
 2. Cadmium
 3. Magnesium
 4. Zinc
 5. Alloys of the above metals D. Plasticizers
 1. Sulfonamide
 2. Phosphate Ester types E. Curing Agents
 1. Sulfonamide
 2. Anhydride types
 3. Photoinitiators
  a. free radical types
  b. cationic types F. Other Additives
 1. Surfactants
 2. Catalysts
 3. Adhesion Promoters
 4. Solvent G. Electroactive Material
 1. Tannin
 2. o-catechol
 3. p-catechol
 4. 1,4-phenylenediamene
 5. Trimer of aniline
 6. Organic dyes.

With reference to FIG. 1, a process flow chart describing each type of coating system is provided. The following examples of each of the systems show how the instant invention may be practiced, but should not be construed as limiting the invention. The general process is described with exemplary materials in parentheses.

High Solids System

The process steps for making and applying an exemplary high solid system are shown in FIG. 1, steps 1.a. through 1.g.

The process for making the coating is outlined in steps 1.a. through 1.c. Any suitable multi-agitator mixer may be utilized for the blending, dispersion, and grinding operations.

The conductive polymer (polyaniline powder) is dispersed in a quantity sufficient to achieve the desired potential along with a plasticizer (sulfonamide) into a resin base (polyurethane). The dispersion is high shear mixed for approximately 30 to 45 minutes at a process temperature of from approximately 70° to 150° F.

Any remaining additives and solvent (not to exceed about 15% by weight), are added to the dispersion and blended for additional time, while maintaining the process temperature. If a two-part coating system is desired, the catalyst should not be added to this mixture until just prior to application of the coating.

The metal, in the form of finely divided particles (aluminum powder or flake), is added to the mixture in a quantity sufficient to achieve the desired potential. Preferably, pure low oxidation aluminum flake or aluminum powder atomized and quenched in an inert environment is used. The aluminum can also be coated with stearic acid to preserve the deoxidized surface. Disperse and grind this mixture further utilizing the same equipment as the previous steps. Grind and disperse for additional 45 minutes or until desired fineness of grind is achieved while maintaining the process temperature below 150° F.

Step 1.d. is a packaging step. Any suitable polypropylene or plastic container can be utilized as packaging. The high solid coating mixture can be discharged directly from the mixing vessel into the packaging container. If a two part system is used, Parts A and B would be packaged separately using methods known in the art.

Surface preparation of the substrate is outlined in step 1.e. A blast cabinet or similar means may be utilized for mechanical surface preparation. Alternately, other methods of surface preparation, including chemical means such as deoxidizing baths, may be utilized. The preferred method comprises lightly blasting the substrate with aluminum oxide grit. The prepared surface should be coated as soon as possible.

Step 1.f. outlines the application of the coating to the substrate. The high solids system is suitable for various methods of applications that are well known and practiced in the art. The coating should be thoroughly mixed prior to application by stirring or shaking. Also, the catalyst should be added at this time if a two-part coating is used. The coating can be applied by dipping, brushing, rolling, or spraying. Coating should be applied uniformly to all surfaces to be coated to a wet coat thickness sufficient to achieve a wet film thickness of 2 to 10 mils.

Step 1.g. is a curing step. Curing can be accomplished by allowing the coated item to stand 24 to 72 hours at room temperature to achieve cure. This process may be accelerated by curing in a thermal oven at 150° F. for 1 to 4 hours.

Radiation Curable System

The process steps for an exemplary radiation curable system are shown in FIG. 1, steps 2.a. through 2.g.

The process for making the coating is outlined in steps 1.a. through 1.c. The conductive polymer (polyaniline) is dispersed in a quantity sufficient to achieve desired potential along with a plasticizer (sulfonamide) into the resin base (polyurethane). The dispersion is accomplished by adding components to mixer, blender, attritor, or multi-agitator mixer and high shear mixing for roughly 15 to 30 minutes, maintaining a process temperature of 100° to 140° F.

Any remaining monomers, oligomers, additives, and photoinitiators are added to the polyaniline dispersion and low shear blended for an additional 15 to 30 minutes while maintaining a process temperature below 140° F.

The metal particles (aluminum flake or powder) are then added to the mixture in a quantity sufficient to achieve desired potential. Preferably, pure low oxidation aluminum flake or aluminum powder atomized and quenched in an inert environment is used. The aluminum can also be coated with stearic acid to preserve the deoxidized surface. Disperse and grind this mixture further utilizing the same equipment as in the previous steps. Grind and disperse an additional 30 to 45 minutes or until desired fineness of grind is achieved.

Step 2.d. is a packaging step. Because this coating system is UV curable, the packaging container must be opaque. Any plastic or polypropylene container that blocks ultraviolet light is suitable for packaging this material.

Step 2.e. is the surface preparation step. Again, as with the high solids system, any suitable means of preparing the substrate surface for coating may be utilized.

Step 2.f. is the application of the coating to the prepared substrate. The coating should be thoroughly mixed prior to coating by stirring or shaking. The coating may be applied by means such as dipping, brushing, rolling, spraying, or others already known in the art. Preferably, the coating is applied uniformly to all surfaces to a wet film thickness of 2–8 mils, which will correspond to an equivalent dry film thickness.

Step 2.g. is a curing step. The coating may be cured by exposure to ultraviolet light, beta radiation, electron beam, or in some instances infrared light. One source of UV radiation suitable for curing these coatings produces UV light in the 250 to 500 nanometer wavelength ranges, at a power of 300 watts/inch.

Powder Coat System

In FIG. 1, steps 3.a. through 3.i., the process steps required to produce a cathodic powder coating according to the invention are outlined.

Step 3.a. is a dry mixing operation that can be accomplished in a blender. The preferred method of mixing is utilizing a vertical blender for dry mixing powders. In this step, a premix is made of the powdered resin base, conductive polymer powder (polyaniline powder), plasticizer (sulfonamide), curing agents, additives, and metal particles (aluminum flake or powder). The conductive polymer and metal particles should be added in a quantity consistent with desired electrical potential. This step may be carried out utilizing high shear mixers or low shear mixers, such as ribbon cutters or tumble blenders. Mix for approximately 1 hour or until thoroughly mixed. The mixing preferably occurs at ambient temperatures. It is important that the process temperature does not exceed the cure temperature for the selected resin system.

Step 3.b. is a melt compounding and extruding process which is preferably accomplished in a reciprocating extruder. Melt compounding assures that all the additives, conductive polymer and metal particles are thoroughly dispersed in the molten resin base. Single screw reciprocating extruders are suitable for accomplishing this step. In the case of thermosetting coatings the temperature should be maintained 20°–50° F. above the melting point of the resin, but kept below 400° F. to avoid deteriorating the polyaniline.

In step 3.c. the melt is subjected to a cooling and flattening operation. The extrudate is cooled and flattened into a sheet about 0.005 inch thick by passing it through chilled nip rolls and cooled on an air or water cooling belt.

Step 3.d. is a primary grind operation preferably performed by a crusher at the end of a cooling line. The cooled, compounded sheet is quite friable and readily broken into chips measuring about 0.003–0.005 inches.

Step 3.e. is a fine grinding operation performed in a cryogenic mixing and grinding vessel. The cryogenic grinding serves three purposes. It allows the processing of low cure temperature thermoset powders, it promotes fracture of the aluminum, and it reduces oxidation of aluminum in the coating. The chips should be ground until a desired screen mesh is achieved. Typical mesh size is from +325 to −400.

Step 3.f. is a packaging step. Any suitable plastic bag or polypropylene container that seals the powder from moisture is acceptable. The finely ground powder coating may be discharged directly from the grinding vessel into the packaging container.

Step 3.g. is the process of surface preparation of the substrate. Mechanical means, such as a blast cabinet may be utilized. Additionally, any suitable means for surface preparation may be utilized.

Step 3.h. is the coating application step. The powder coating according to the invention may be applied using an electrostatic spray system, or other application means known in the art. If the powder coating is applied by thermal spraying, the substrate is usually preheated to a temperature slightly above the melting point of the powder.

Step 3.i. is the curing step. Cathodic thermoset powder coating systems are typically cured in thermal ovens. Curing temperatures below 4000 F should be used to prevent deterioration of the polyaniline in the powder. Cure is generally accomplished in 10 to 30 minutes. Cathodic thermoplastic powder coating systems that are thermally sprayed are allowed to cure utilizing residual heat produced by the thermal spray and preheated substrate.

Typical formulations for the coating systems according to the present invention are presented below. The following examples are intended to show various embodiments of the invention only and are not intended to limit the scope of the invention. All of the volume percentages listed are considered approximate.

In the powder coating compositions, it has been found that advantages are obtained when the ICP/Metal particle blend is encapsulated in a dielectric binder. Such encapsulation enables electrostatic application methods. The binder dissipates out when the coating is subjected to high temperature curing, leaving behind the conductive pathway for electron flow.

EXAMPLE I

High Solids System (Two Part)

| COMPONENT | TRADE NAME | VOLUME % |
|---|---|---|
| PART A | | |
| Polyamide Resin | Epon 828 | 50.00 |
| Polyaniline | LIGNO-PANI | 12.5 |
| Aluminum Paste | Eckart 235 | 37.5 |
| | | 100% Part A |
| PART B | | |
| Amine Curing Agent | Epicure-3192 | 90 |
| Isopropyl Alcohol | | 10 |
| | | 100% Part B |

Equal volume amounts of Parts A and B are mixed immediately prior to application to the substrate.

EXAMPLE II

High Solid System (One Part)

| COMPONENT | TRADE NAME | VOLUME % |
|---|---|---|
| Urethane Resin | | 51.00 |
| Phenolic Resin | | 5.00 |
| Polyaniline Powder | Versicon | 7.00 |
| Aluminum Powder | Al-120 | 12.00 |
| Ethyl toluenesulfonamide | Uniplex 108 | 5.00 |
| VM&P naptha | | 3.00 |
| Xylene | | 3.00 |
| Mineral Spirits | | 14.00 |

EXAMPLE IIA

High Solids System (One Part) with Electroactive Materials

| COMPONENT | TRADE NAME | VOLUME % |
|---|---|---|
| Urethane Resin | | 51.00 |
| Phenolic Resin | | 5.00 |
| Tannin Powder | | 7.00 |
| Aluminum Powder | Al-120 | 12.00 |
| Ethyl toluenesulfonamide | Uniplex 108 | 5.00 |
| VM&P naptha | | 3.00 |
| Xylene | | 3.00 |
| Mineral Spirits | | 14.00 |

The embodiment shown in IIA above is the formulation for the coating system substituting electroactive materials for the inherently conductive polymer, wherein the electroactive material is a member of the group comprising tannins, o-catechol, p-catechol, 1,4-phenylenediamine, 1,2-phenylenediamine, trimer of aniline (i.e. oxidative polymerization product of 1 mole of 1,4-phenylenediamine and 2 moles of aniline) and several organic dyes. As an example, a reaction utilizing an electroactive material in conjunction with Aluminum particles to prevent corrosion on an iron substrate is as follows:

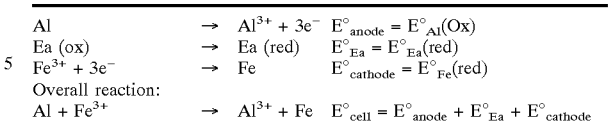

Therefore, the preferred (but not exclusive) reduction potential of the electroactive species to be used in conjunction with an active species to protect a more noble one (i.e. substrate) is governed by the following equation:

$$E^{\circ}_{Ea} \geq -(E^{\circ}_{anode} + E^{\circ}_{catiode})$$

EXAMPLE III

UV-Radiation Cure System

| COMPONENT | TRADE NAME | VOLUME % |
|---|---|---|
| Aliphatic urethane diacrylate | Ebercryl 4883 | 18.00 |
| Isobornyl acrylate | SR 506 | 33.00 |
| Polyaniline powder | Versicon | 10.00 |
| Acrylate polyester oligomer | Ebecryl 450 | 15.00 |
| 2-hydroxy-2-methyl-1-phenyl-1-propanone | Darocur 1173 | 5.00 |
| Hydroxycyclohexyl phenylketone | Irgacure 184 | 0.50 |
| Metallic diacrylate | SR 9016 | 5.00 |
| Aluminum Powder | AL-120 | 8.50 |
| Ethyl toluenesulfonamide | Uniplex 108 | 5.00 |

EXAMPLE IV

Powder Coat System

| COMPONENT | TRADE NAME | VOLUME % |
|---|---|---|
| Low density polyethylene | NA204 | 71.5 |
| Polyaniline powder | Versicon | 16.00 |
| Ethyl toluenesulfonamide | Uniplex 108 | 2.5 |
| Aluminum Powder | AL-120 | 10.00 |

The claimed improvements in corrosion resistance by use of the coating systems according to the invention are validated through markedly improved protection of the substrate when subjected to the salt spray test. Coated panels were intentionally scribed and tested in accordance with the procedure outlined in ASTM B117-95. The panels exhibited only slight surface oxidation at the damaged areas after 800+ hours in a salt spray chamber.

The ASTM B117 salt spray test utilized to test the corrosion resistance of this cathodic coating system comprises a salt fog chamber. The chamber is comprised of a fog chamber, salt solution reservoir, conditioned compressed air line, fog nozzle, specimen support racks, heater, and controller. The specimens are supported in racks at an angle between 15 and 30 degrees from vertical parallel to the principal direction of horizontal flow of fog through the chamber. The salt solution is mixed at 5%+/−1% salt by weight with water meeting the requirements of ASTM 1193-91, Type III. The pH of the condensed fog is maintained between 6.5 and 7.2. Temperature in the chamber is maintained at 95° F., +2° or −3°. Relative humidity in the chamber is maintained at 95% to 98%.

The test specimens consist of standard 3×5 inch Q-panels, manufactured from cold rolled 1010 steel. The panels are coated utilizing the method described. The substrate is then intentionally scribed to base metal in an "X" pattern. The partially exposed base metal allows evaluation of the cathodic properties of the coating versus its performance as strictly an electrolytic barrier.

The test results indicate utilization of this coating method will extend the service life of metals.

It has been discovered that improved performance and stability of the coating composition employing an inherently conductive polymer (ICP), a metal, metal alloy or mixture thereof, and a resin binder system can be attained by utilizing certain processing techniques.

Figure 2:
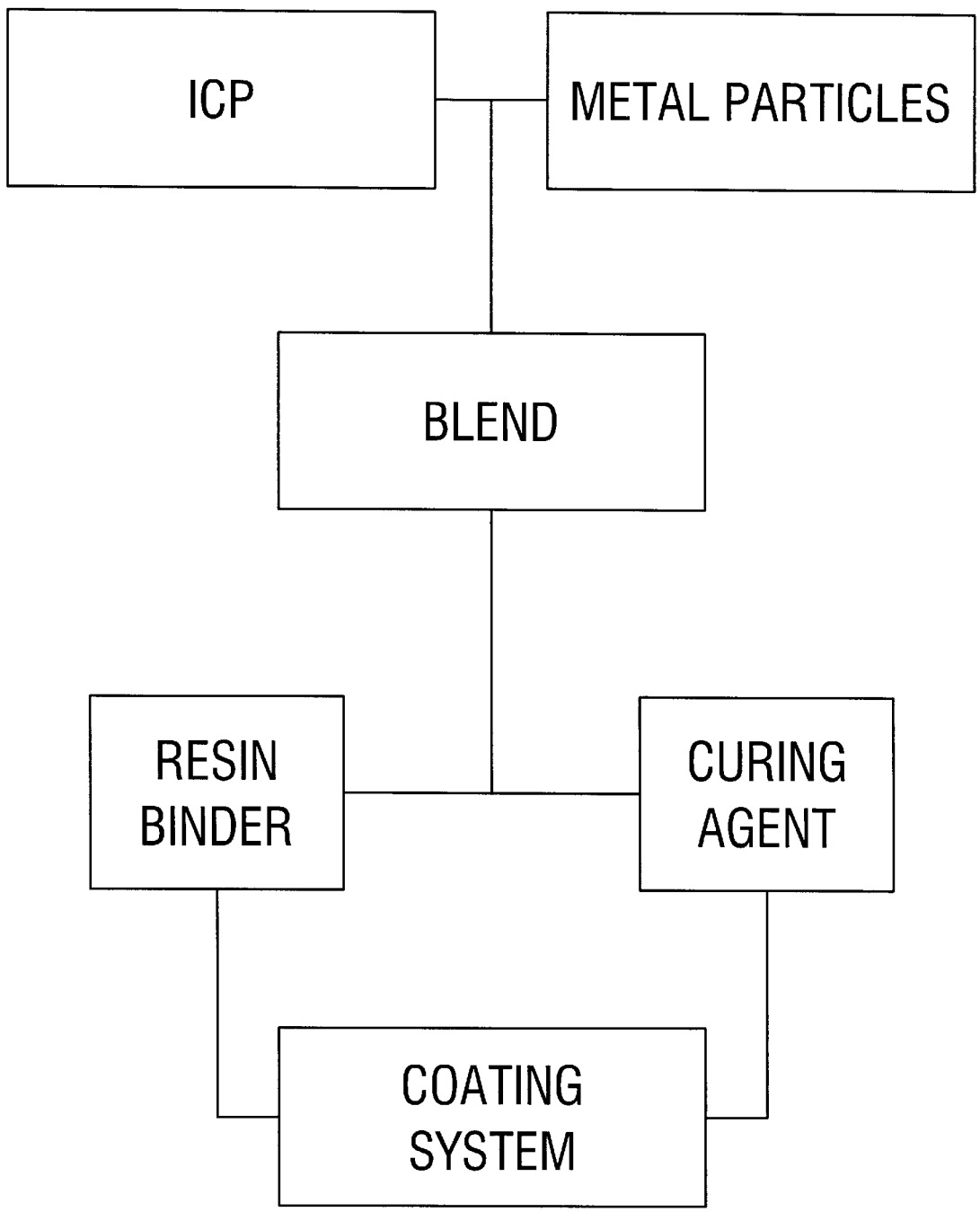
FIG. 2 shows a process flow chart for producing a coating system according to the invention.

If the ICP is premixed with the metal particles, unexpected and advantageous results occur. In the preferred method, illustrated in the flow chart of FIG. 2, the ICP is premixed with the metallic particles at a process temperature of at least 100° F., preferably 100° F. to 220° F., for a sufficient period of time, dependent on batch size, in order to drive off $H_2$. At the upper end of the temperature range, the preferred time period extends from ½ hour to 5½ hours or more. More preferably, a longer induction time at the lower temperature range may prove to be advantageous. For example, an induction time of 24 hours, or more, in a hot house at the lower end of the temperature range provides the desired results.

During the mixing process, the formation of hydrogen gas ($H_2$) occurs, such as would normally happen over a long period of time in a prior art finished formulation, thereby resulting in instability of the coating composition. However, it has been found that forcing the reaction during the production process assures a stable finished product. Applicant's alone have made this discovery, as no prior art teaches premixing metallic particles with the ICP when preparing a coating system in order to drive off $H_2$ and promote long-term stability of a coating composition.

Applicants have further identified that processing the ICP with the metallic particles in the heating chamber removes unwanted oxidation of the metallic particles, presumably due to the acidic nature of the ICP.

In the premixing process, a blend is formed which contains the ICP, metallic particles, an ICP/metal particle complex, as well as a metal oxide. Formulations of coating systems employing this premix blend have demonstrated increased corrosion performance, stability, and other improved qualities over similar formulations, having the same ratios of the components without the novel processing step.

Coating compositions utilizing the novel processing step retain the sought after cathodic/sacrificial properties, while providing improved barrier protection due to the inclusion of the metal oxide.

It has further been discovered that incorporation of "nano-scale polymerized clay materials" (nanomers) into a preferred embodiment provides improved barrier properties as well as improved electron flow for the metal particles when combined with the ICP/metal particle blend and added to a coating system. By "nanomers" is meant composites of montmerillonite clays made up of Aluminum, Iron, and Magnesium encapsulated in platelets of silica. These materials do exhibit conductive properties, thus enhancing electron flow of the metal particles, and due to their complex molecular structures, they offer barrier enhancement as well.

In addition, rheology agents which assist in flowability, hardness, and dispersion of the ICP/metal blend may be included in a preferred embodiment of a coating system according to the invention.

Further, applicants' invention is not limited to solvent-borne coating systems. Because water-soluble conductive polymers are available, the present invention may be provided with a water-borne resin binder.

In the prior art, it is well known to use "two-part" coating systems wherein Part A is generally the base resin and Part B is generally the curing agent. It is common practice to provide epoxy resin formulations wherein the Epoxy base resin (Part A) is utilized with an Amine-type curing agent (Part B). However, in the practice of the prior art, it has been impossible to utilize the inherently conductive polymers (ICP) with an Amine-type curing agent due to the "de-doping" effect caused by the amine-type agent which renders the ICP non-conductive.

However, it has been discovered by the Applicants that the novel processing step of providing a blend including an ICP/metal particle complex allows the use of Amine-type curing agents in a two-part coating system. This discovery offers the advantage of providing a curing possibility at ambient temperature. Further, it has been found that the blend may be incorporated into either the Part A resin component or the Part B cure component, or both, during formulation of a two-part coating system. Those of skill in the art will readily appreciate that the blend can be incorporated into any component of a multi-part formulation.

One further advantage provided by the novel processing step of providing a blend is in the area of powder coating. The novel processing step allows the formulation of a coating system which utilizes an inherently conductive polymer which can be electrostatically applied to the substrate. The ICP/metal particle complex is effectively encapsulated in the powder binder. For example, epoxy spheres bind the ICP/metal particle complex and dissipates the electrical charge. Thereafter, during cure, the heat releases the ICP/metal particle complex to provide a viable cathodic coating.

In the practice of the present invention, certain inherently conductive polymers which are lignosulfonic acid-doped polyaniline (ligno-pani) may be preferred because it is water dispersible and soluble in common organic solvents such as DMSO and THF. Ligno-pani may also be preferred due to its increased processability as well as reduced cost. Studies conducted with ligno-pani formulations suggest that the ligno-pani can retain redox capacity up to a pH between 8–10, which allows for the applicability of ligno-pani even in basic environments.

Further examples of preferred embodiments of the present invention are as follows:

EXAMPLE V

Water Borne Coating Composition

| COMPONENT | TRADE NAME | WEIGHT % | Vol. % |
|---|---|---|---|
| ICP | Bayton P | ~14 | ~17 |
| Metal Powder | Eckart Aluminum 5025 | ~26 | ~25 |
| Resin | RO Primer 3781 | ~54 | ~50 |
| Water | — | ~6 | ~7 |

EXAMPLE VI

Coating Composition

| COMPONENT | TRADE NAME | WEIGHT % | Vol. % |
|---|---|---|---|
| ICP | Bayton P | ~12 | ~15 |
| Metal Particles | Eckart Aluminum 5025 | ~35 | ~35 |
| Resin | RO 3781 Primer | ~53 | ~50 |

A preferred method in which a laboratory batch of a water borne coating composition was prepared is given below.

75 grams of Aluminum Paste (Eckart 5025) was placed in a mixing vessel. While stirring, 25 grams of the Inherently conductive Polymer Baytron P was added to the Aluminum material to form the inventive ICP/metal blend. The blend was mixed for 1 hour and placed in a plastic container with the lid loosened to enable outgassing of Hydrogen.

The plastic container was placed in a heating chamber maintained at 120° F. for a period of twenty hours allowing for an induction process between the ICP and the Aluminum which creates a Hydrogen gas release. Thereafter, the blend was cooled to ambient temperature.

100 grams of a Water-Borne Acrylic Latex Primer (RO5281) was placed in the mixing vessel. While stirring, 100 grams of the ICP/aluminum blend was added to the primer and mixed for 1 hour.

The finished formulation sat at ambient temperature for 48 hours allowing for a digestion period.

EXAMPLE VII

Solvent Borne Coating Composition

A preferred method in which a laboratory batch of a solvent borne coating composition was prepared is given below.

75 grams of an Aluminum paste (Eckart 236) was placed in a mixing vessel. While stirring, 25 grams of an Inherently conductive Polymer (GeoTech Ligno-Pani) was added to the Aluminum paste and mixed for 1 hour. The blend was placed in a plastic bottle.

The plastic bottle containing the blend was placed in a heating chamber maintained at 120° F. for a period of twenty-four hours allowing for an induction process between the ICP and the aluminum paste. Thereafter, the blend was cooled to ambient temperature.

Part A: 50 grams of an Epoxy resin (Shell Epon 828) was placed in a mixing vessel. While stirring, 100 grams of the ICP/aluminum blend was added and mixed for 1 hour. The composition was allowed to digest for 48 hours at ambient temperature.

Part B: 50 grams of an Amine curing agent (Shell epi-cure).

At the time of application, Part A was placed in a mixing vessel. While stirring, Part B was added to Part A. While stirring, 4 grams of Isopropyl alcohol was added to the mixing vessel in order to reduce viscosity. The finished formulation was allowed to digest for 30 minutes before application.

In an alternate method of preparation, the ICP/Metal particle blend can be added to the Amine curing agent (Part B) rather than incorporating it into the Epoxy Resin (part A). As above, Part A and Part B are mixed together at the point of application.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

What is claimed is:

1. A method of preparing a coating system adapted for use on an associated metallic substrate, the coating system including a resin binder, an electroactive material, metallic particles which are anodic to the metallic substrate, and a curing agent, the method including the steps of:

mixing the electroactive material with the metallic particles to form a blend including an electroactive material/metal particle complex;

providing a resin binder selected from the group consisting of water-borne resin systems and solvent-borne resin systems;

providing a curing agent; and, mixing the blend, the resin binder, and the curing agent prior to application to the associated metallic substrate.

2. The method of claim 1 wherein the step of mixing the electroactive material with the metallic particles includes the step of:

mixing the electroactive material with metallic particles at a process temperature of at least 100° F.

3. The method of claim 2 wherein the process temperature is maintained for a period of time sufficient to drive off a predetermined amount of $H_2$.

4. The method of claim 1 further comprising the step of:

combining a predetermined amount of nano-scale polymerized clay materials with the blend prior to the step of mixing the blend, the resin binder, and the curing agent.

5. The method of claim 1 wherein the electroactive material is at least one member of the group consisting of tannins, o-catechol, p-catechol, 1,4-phenylenediamine, 1,2-phenylenediamine, trimer of aniline, and organic dye.

6. The method of claim 1 wherein the metal is at least one member of the group consisting of aluminum, cadmium, magnesium, zinc, aluminum alloys, cadmium alloys, magnesium alloys, and zinc alloys.

7. The method of claim 1 wherein the resin binder is at least one member of the group consisting of polyurethanes, epoxies, neutral resins, acidic resins, acrylates, polyesters, and glycidyl acrylates.

8. The method of claim 1 wherein the curing agent is at least one member of the group consisting of sulfonamide, anhydride types, free radical photoinitiators, cationic photoinitiators, polyamines, ethylene diamine, ethylene triamine, fatty acids and Lewis acids.

9. The method of claim 1 wherein the step of mixing the electroactive material with the metallic particles further includes the steps of:

providing the electroactive material in an amount from approximately 1% to 35% by volume of the coating system; and, providing the metallic particles in an amount from approximately 5% to 50% by weight of the coating system.

10. The method of claim 1 further comprising the step of:

incorporating rheology agents into the resin binder prior to the step of mixing the blend, the resin binder, and the curing means.

11. A coating system formed by the method of claim 1 wherein:
- the electroactive material is at least one member of the group consisting of tannins, o-catechol, p-catechol, 1,4-phenylenediamine, 1,2-phenylenediamine, trimer of aniline, and organic dye;
- the metal is at least one member of the group consisting of aluminum, cadmium, magnesium, zinc, aluminum alloys, cadmium alloys, magnesium alloys and zinc alloys;
- the resin binder is at least one member of the group consisting of polyurethanes, epoxies, neutral resins, acidic resins, acrylates, polyesters, and glycidyl acrylates; and,
- the curing agent is at least one member of the group consisting of sulfonamide, anhydride types, free radical photoinitiators, cationic photoinitiators, and amine types.

12. The coating system of claim 11 wherein the at least one electroactive material comprises between 1% and 35% by volume of the coating system.

13. The coating system of claim 11 wherein the metal comprises between 5% and 50% by weight of said coating system.

14. The coating system of claim 11 wherein the metal exhibits a sufficient volt potential difference from the associated metallic substrate to form a cathodic coating.

15. A method of protecting a metallic substrate from corrosion including the steps of:
- preparing a coating system comprising a resin binder, an electroactive material, metallic particles which are anodic to the metallic substrate, and a curing agent wherein the electroactive material is premixed with the metallic particles at a predetermined process temperature for a predetermined period of time to form a electroactive material/metal particle complex;
- preparing a surface of the metallic substrate for adhesion to the coating system;
- coating the prepared surface with the coating system; and,
- curing the coating composition to form a corrosion resistant coating on the prepared surface.

16. The method of claim 15 wherein the predetermined process temperature is at least 100° F.

17. The method of claim 15 wherein the predetermined period of time is at least ½ hour.

18. The method of claim 15 wherein the coating system is a powder coating system and wherein the step of coating the prepared surface with the coating system includes the step of:
- electrostatically applying the coating system to the associated substrate.

* * * * *